United States Patent
Banna et al.

(10) Patent No.: US 10,422,984 B2
(45) Date of Patent: Sep. 24, 2019

(54) FLEXIBLE MODE SCANNING OPTICAL MICROSCOPY AND INSPECTION SYSTEM

(71) Applicant: APPLIED MATERIALS, INC., Santa Clara, CA (US)

(72) Inventors: Samer Banna, San Jose, CA (US); Waheb Bishara, San Mateo, CA (US); Dong Wu, Fremont, CA (US); Mehdi Vaez-Iravani, Los Gatos, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 210 days.

(21) Appl. No.: 15/615,679

(22) Filed: Jun. 6, 2017

(65) Prior Publication Data

US 2018/0329189 A1    Nov. 15, 2018

Related U.S. Application Data

(60) Provisional application No. 62/505,767, filed on May 12, 2017.

(51) Int. Cl.
*G01N 21/00* (2006.01)
*G02B 21/00* (2006.01)
(Continued)

(52) U.S. Cl.
CPC ......... *G02B 21/0032* (2013.01); *G02B 23/04* (2013.01); *G02B 5/0284* (2013.01); *G02B 21/004* (2013.01); *G02B 21/0056* (2013.01)

(58) Field of Classification Search
CPC ........... G01N 15/0205; G01N 15/1459; G01N 21/29; G01N 2015/1486; G01N 21/53
(Continued)

(56) References Cited

U.S. PATENT DOCUMENTS

| | | |
|---|---|---|
| 6,922,236 B2 | 7/2005 | Vaez-Iravani et al. |
| 7,477,372 B2 | 1/2009 | Leslie et al. |

(Continued)

FOREIGN PATENT DOCUMENTS

WO    2016/106350 A1    6/2016

OTHER PUBLICATIONS

The International Search Report and Written Opinion for Application No. PCT/US2018/031863, dated Aug. 29, 2018, 20 pages.

*Primary Examiner* — Md M Rahman
(74) *Attorney, Agent, or Firm* — Kilpatrick Townsend & Stockton LLP

(57) ABSTRACT

A method for flexible inspection of a sample includes forming an input beam using a beam source, blocking a portion of the input beam using an input mask, and forming a shaped beam from a portion of the input beam. The shaped beam is received at a first portion of an objective lens and focused onto a sample. A reflected beam is collected at a second portion of the objective lens. Scattered light is collected at the first and second portions of the objective lens and at a third portion of the objective lens. The scattered light is received at a dark-field detector module and a portion of the scattered light is directed to a dark-field detector. The dark-field detector module includes an output mask having one or more output apertures that allow at least part of the scattered light that passes through the third portion of the object lens to pass as the portion of the scattered light that is directed to the dark-field detector.

17 Claims, 7 Drawing Sheets

(51) Int. Cl.
*G02B 23/04* (2006.01)
*G02B 5/02* (2006.01)

(58) Field of Classification Search
USPC .......................................................... 356/337
See application file for complete search history.

(56) References Cited

U.S. PATENT DOCUMENTS

| | | |
|---|---|---|
| 2003/0179369 A1 | 9/2003 | Feldman et al. |
| 2006/0007448 A1 | 1/2006 | Hwang et al. |
| 2007/0153265 A1 | 7/2007 | Vaez-Iravani et al. |
| 2009/0059215 A1 | 3/2009 | Mehanian et al. |

FLEXIBLE MODE SCANNING OPTICAL MICROSCOPY AND INSPECTION SYSTEM

CROSS-REFERENCE TO RELATED APPLICATIONS

This application claims the benefit of U.S. Provisional Application No. 62/505,767, filed May 12, 2017, the entire contents of which are incorporated herein by reference in their entirety for all purposes.

TECHNICAL FIELD

Embodiments described herein relate generally to systems and methods for optical microscopy and inspection.

BACKGROUND

A fundamental aim of microscopy and inspection is to generate contrast from an object under examination on a point-by-point basis. Without contrast nothing can be distinguished. In this context, the notion of point-by-point refers to limits of observation as determined by resolution of a system.

The need to provide sufficient contrast to discern details has led to the development of many useful inspection techniques. Examples include dark-field microscopy, phase-contrast imaging, differential interference contrast microscopy, and Schlieren photography.

Within each one of these techniques there are numerous variations, each designed for a particular purpose or situation. The different techniques or variations can provide different information. Thus, multiple techniques or variations are often used to examine an object. This is particularly true when the sample under examination displays characteristics that favor one form of imaging in one region and a different form of imaging in another.

Of the various forms of imaging techniques, the use of scattered light is particularly useful in certain applications. Scattered light gives rise to a signal that is dark-field in nature. If the sample is uniform in composition and topography, then there is no mechanism for the illuminating light to be scattered. On the other hand, a defect or variation can scatter the illuminating light and provide a dark-field signal.

Dark-field imaging can be used to detect small variations in otherwise homogenous surroundings. As an example, dark-field imaging can be used to inspect semiconductor device structures for minute defects that may be in the form of particles on a surface, faults in an otherwise perfect (or almost perfect) array, slight protrusions (or mouse-bites) in line structures, or other defects. These defects are often difficult to discern in a bright-field mode because the signals from surrounding structures are often so strong that they overwhelm the more subtle signals from small defects. Using dark-field imaging in this situation allows the bright background to be largely eliminated so that scattered light from defects can be detected.

There are two main types of dark-field microscopy that are distinguished by their illumination techniques, one uses normal incidence of illumination and the other uses oblique incidence of illumination. In the former, light that is scattered to regions surrounding the illumination aperture is collected. This mode is often referred to as grey-field imaging due to the proximity of the scattered light to the illuminating light.

The oblique incidence technique can be single dark-field or double dark-field. It is referred to as single dark-field if the scattered light is collected in the plane of incidence. It is referred to as double dark-field if the scattered light is collected outside the plane of incidence and to the side, i.e. if the collection space differs from the illumination space in both polar and azimuthal directions (i.e., along different angular directions up and down from the plane of the sample and around a direction perpendicular to the sample).

Conventional oblique incidence dark-field imaging systems use separate components for illumination and collection. For example, the illumination is typically performed by the focusing action of a lens that is held at an angle with respect to the sample, and the collection is typically performed by a separate lens. Such a system requires separate illumination and collection components arranged in fixed positions. These components occupy a certain amount of the available numerical aperture (NA) space above the sample. As such, the NA allocated to illumination is limited. This limits resolution since interrogation spot size (in linear dimensions) is inversely proportional to the NA. Furthermore, using components that are fixed in position restricts collection space to specific regions. Thus, improved systems and methods having increased flexibility are desired.

SUMMARY

In light of the above, systems and methods for optical microscopy and inspection are provided for flexible inspection of a sample. In an embodiment, for example, an inspection system includes an input mask that allows a shaped beam to pass through part of an objective lens where it is focused on a sample. A beam that is reflected from the sample passes through part of the objective lens and is directed to a bright-field detector. A portion of the scattered light that passes through other parts of the objective lens is directed to a dark-field detector. Thus, the objective lens in this embodiment can be used to focus an input beam onto the sample and collect reflected and scattered light from the sample.

In accordance with a specific embodiment, a method for flexible inspection of a sample includes forming an input beam using a beam source, blocking a portion of the input beam using an input mask, and forming a shaped beam from a portion of the input beam. The shaped beam is the portion of the input beam that passes through an aperture in the input mask. The shaped beam is received at an objective lens and focused onto a sample. The shaped beam passes through a first portion of the objective lens. A reflected beam is collected at the objective lens.

The reflected beam is a portion of the shaped beam that is reflected from the sample. The reflected beam passes through a second portion of the objective lens. The reflected beam is received at a bright-field detector module and directed to a bright-field detector. Scattered light is collected at the objective lens. The scattered light is a portion of the shaped beam that is scattered by the sample. The scattered light passes through the first and second portions of the objective lens and through a third portion of the objective lens. The first and second portions of the objective lens are different from the third portion of the objective lens. The scattered light is received at a dark-field detector module and a portion of the scattered light is directed to a dark-field detector. The dark-field detector module includes an output mask having one or more output apertures. The output mask blocks the scattered light that passes through the first and second portions of the objective lens. The one or more output apertures allow at least part of the scattered light that passes through the third portion of the object lens to pass as the portion of the scattered light that is directed to the dark-field detector.

Embodiments are also directed to apparatuses for carrying out the disclosed methods and include apparatus parts for performing each described method feature. The method features may be performed by way of hardware components, a computer programmed by appropriate software, by any combination of the two, or in any other manner. Furthermore, embodiments are also directed to methods of operating the described apparatuses and include method features for carrying out every function of the apparatuses.

Further aspects, advantages, and features are apparent from the claims, description, and accompanying drawings.

BRIEF DESCRIPTION OF THE DRAWINGS

The various embodiments described herein, both as to organization and method of operation, together with features and advantages thereof, can best be understood by reference to the following detailed description and accompanying drawings, in which.

Figure 1:
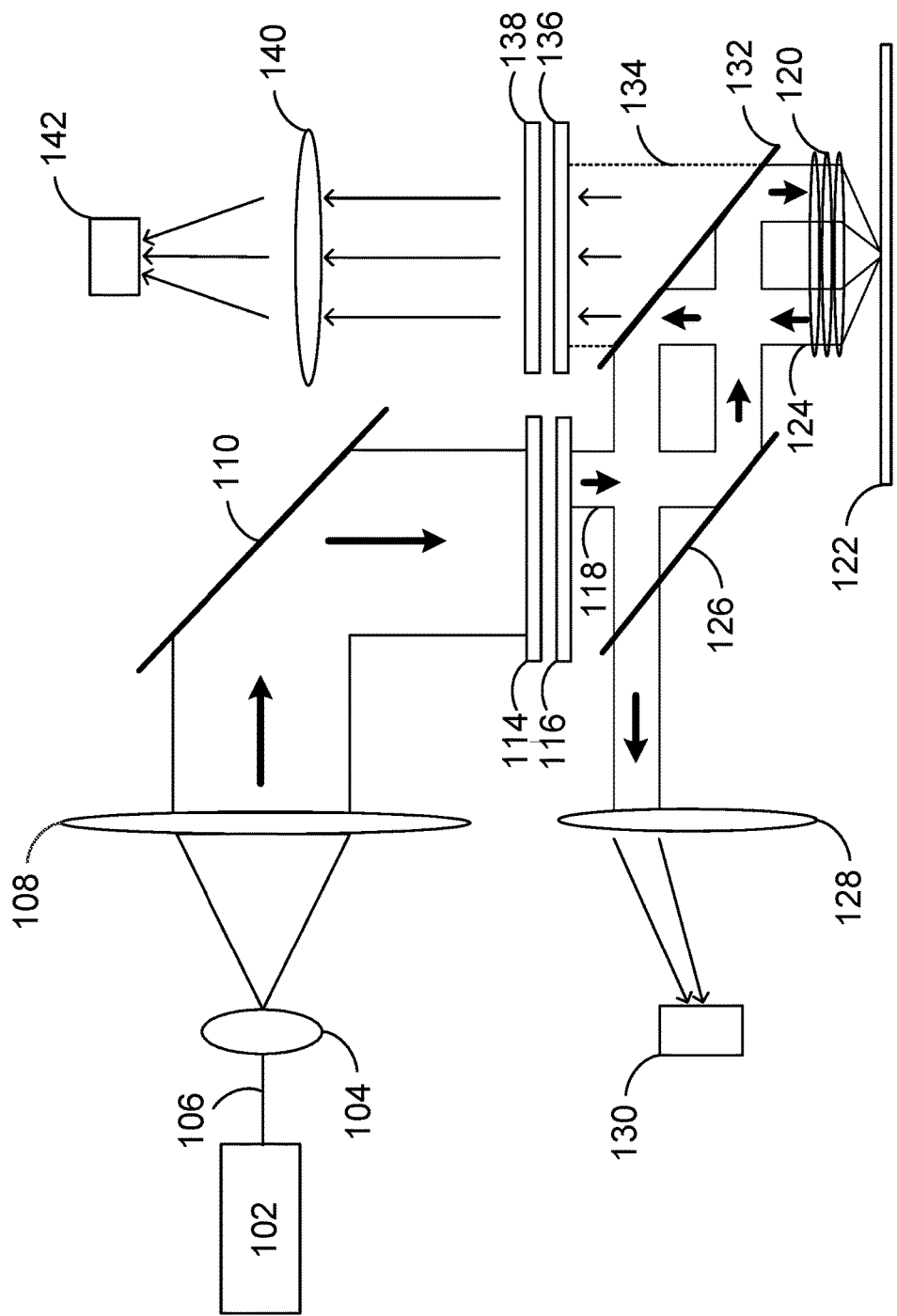
FIG. 1 is a simplified cross-sectional view of a flexible mode scanning optical microscopy and inspection system in accordance with an embodiment.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the embodiments described herein. However, it should be understood that the various embodiments can be practiced without these specific details. In other instances, well-known methods, procedures, and components have not been described in detail so as not to obscure the described features.

Reference will be made in detail to the various embodiments, one or more examples of which are illustrated in the figures. Each example is provided by way of explanation and is not meant as a limitation. Further, features illustrated or described as part of one embodiment can be used on or in conjunction with other embodiments to yield yet a further embodiment. The description is intended to include these modifications and variations.

A "specimen" or "sample" as referred to herein, includes, but is not limited to, semiconductor wafers, semiconductor workpieces, photolithographic masks, and other workpieces such as memory disks and the like. According to some embodiments, which can be combined with other embodiments described herein, the apparatus and methods are configured for or are applied for inspection, for critical dimensioning applications, and defect review applications.

Any reference in the specification to a method should be applied mutatis mutandis to a system capable of executing the method.

Any reference in the specification to a system should be applied mutatis mutandis to a method that can be executed by the system.

Embodiments described herein relate generally to systems and methods for optical microscopy and inspection. In accordance with an embodiment, for example, a system for bright-field and dark-field inspection of a sample is provided. The system includes an input mask that allows a shaped beam to pass through part of an objective lens where it is focused on a sample. A beam that is reflected from the sample passes through a part of the objective lens and is directed to a bright-field detector. A portion of the scattered light that passes through other parts of the objective lens is directed to a dark-field detector. Thus, a single objective lens can be used to focus a shaped beam onto the sample and to collect reflected and scattered light from the sample.

FIG. 1 is a simplified cross-sectional view of a flexible mode scanning optical microscopy and inspection system in accordance with an embodiment. In this example, an input beam 106 provided by a source 102 passes through a beam expander 104 and collimator 108.

The source 102 may be a laser and the input beam may be a light beam in some embodiments. The input beam is directed from the collimator 108 toward a polarizing element 114 and input mask 116. In some embodiments, the input beam may be directed toward the polarizing element 114 using one or more reflectors such as mirror 110. The polarizing element 114 imparts a particular polarization to the input beam. The input mask 116 may be configured to block a portion of the input beam and may include an input aperture arranged to allow a portion of the input beam to pass as a shaped beam 118.

The shaped beam 118 is directed from the input mask 116 to an objective lens 120 where it is focused onto a sample 122. The shaped beam 118 may be directed to the objective lens using one or more reflectors such as beam splitters 126, 132. A portion of the shaped beam 118 that is focused onto the sample 122 is reflected to provide a reflected beam 124. In this example, the shaped beam 118 is focused at an oblique angle onto the sample 122, and the reflected beam 124 is reflected at an oblique angle from the sample 122. Also in this example, the shaped beam 118 passes through a first portion of the objective lens 120, and the reflected beam 124 passes through a second portion of the objective lens 120 that is different from the first portion.

The reflected beam 124 is directed from the objective lens 120 to a bright-field detector 130. In this example, the reflected beam 124 is directed to the bright-field detector 130 using beam splitters 126, 132 and focusing element 128. Bright-field signals are generated from the reflected beam 124.

Although not specifically shown in FIG. 1, the objective lens 120 also collects scattered light from the sample 122. The scattered light is a portion of the shaped beam 118 that is scattered by the sample (or by defects on the sample). The scattered light may pass through the first and second portions of the objective lens 120 as well as a third portion of the objective lens 120. The third portion of the objective lens 120 will be described more fully below with regard to FIGS. 2a-2e. In some embodiments, the first, second, and third portions of the objective lens 120 comprise different portions of the objective lens 120.

The scattered light is directed from the objective lens 120 toward a focusing element 140 and dark-field detector 142. FIG. 1 shows scattered light 134 passing through the beam splitter 132 to polarizing element 136 and output mask 138. The output mask 138 may be configured to block portions of the scattered light 134 that pass through the first and second portions of the objective lens 120. The output mask 138 may include one or more output apertures arranged to allow at least a portion of the scattered light 134 that passes through the third portion of the objective lens 120 to pass as the portion of the scattered light that is directed to the dark-field detector 142. Dark-field signals are generated from the portion of the scattered light that is received at the dark-field detector 142.

The polarizing element 136 can be used in accordance with known techniques to highlight certain defects such as particles, or suppress certain features such as surface roughness, as well as achieve other desirable outcomes.

The objective lens 120 shown in FIG. 1 may be a high numerical aperture (NA) lens. In some embodiments, the NA may be 0.9, 0.95, or higher. The available NA can be allocated differently between illumination and collection functions depending on the application. In FIG. 1, for example, the input mask 116 provides a shaped beam 118 that illuminates one side of the objective lens 120. The remainder of the NA of the objective lens 120 (minus the NA needed for the reflected beam 124) is available for collection of the scattered light. The output mask 138 can be modified to allow single and/or double dark-field imaging. The output mask 138 can be configured to allow scattered light to pass to the dark-field detector 142 from any particular collection region of the objective lens 120.

FIGS. 2a-2e are simplified plan views of objective lens apertures, each showing how different regions of an objective lens aperture may be used for directing light to a sample and collecting light from a sample. These examples are not intended to be exhaustive, but rather to provide a sampling of some input and output mask configurations that may be used for directing and collecting light in accordance with some embodiments. Many other configurations may be used and are included in the scope of the claims.

Figure 2B:
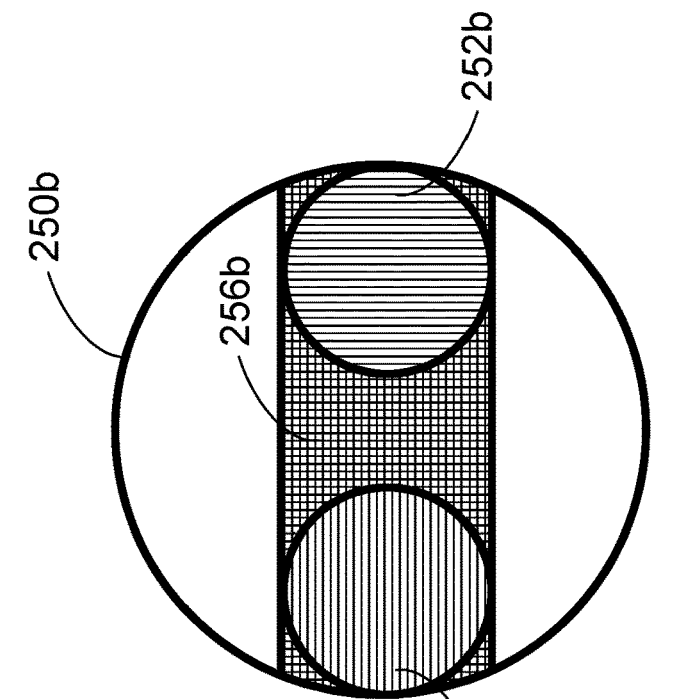
FIGS. 2a-2e are simplified plan views of objective lens apertures, each showing how different regions of an objective lens aperture may be used for directing light to a sample and collecting light from a sample in accordance with some embodiments.
Figure 2A:
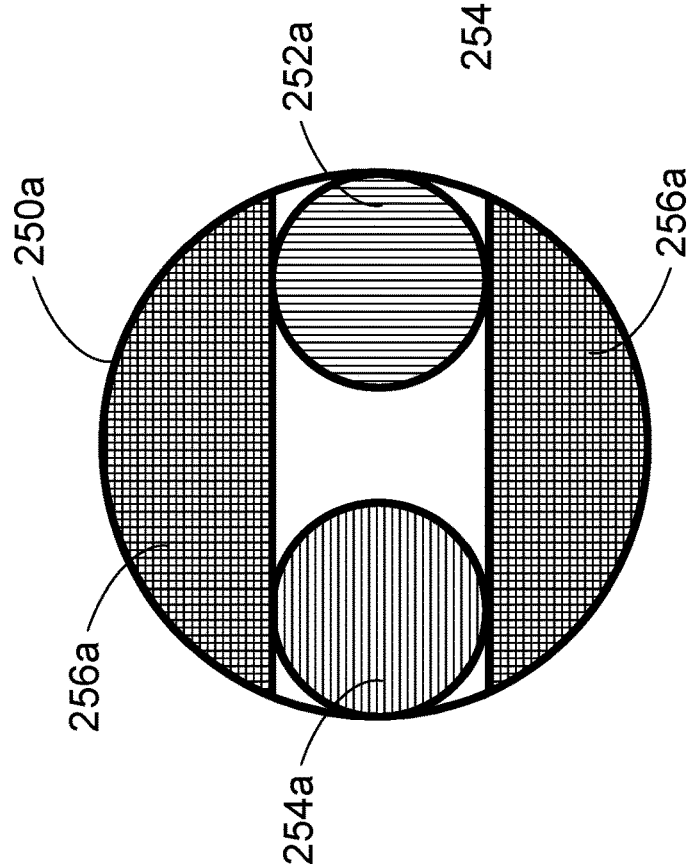

FIG. 2a is a simplified plan view of an objective lens aperture 250a having a region 252a that may be used for an input beam (e.g., shaped beam 118 in FIG. 1), a region 254a that may be used for a reflected beam (e.g., reflected beam 124 in FIG. 1), and regions 256a that may be used for collection of the portion of scattered light that is provided to a dark-field detector (e.g., the scattered light that passes through output mask 138 in FIG. 1).

The pattern shown in FIG. 2a is not intended to suggest that different regions of the objective lens aperture 250a are configured to only let light from particular sources to pass. Instead, in this example, an input mask (e.g., input mask 116 in FIG. 1) is configured to provide an input beam that is directed to region 252a. The objective lens focuses the beam on a sample at an oblique angle, and a reflected beam is received at region 254a. Scattered light may be collected across the entire NA of the objective lens, but an output mask (e.g., output mask 138 in FIG. 1) is configured to allow only that portion of the scattered light that is collected in regions 256a to pass. This is an example of double dark-field imaging because the collection space differs from the illumination space in both polar and azimuthal directions. The scattered light that is collected in the middle region of the objective lens aperture 250a that includes the regions 252a, 254a is blocked by the output mask.

FIG. 2b is a simplified plan view of an objective lens aperture 250b having a region 252b that may be used for an input beam, a region 254b that may be used for a reflected beam, and a region 256b that may be used for collection of the portion of scattered light that is provided to a dark-field detector. This is an example of single dark-field imaging because the collection space is in the plane of incidence. The scattered light that is collected in the regions on each side of the middle region are blocked by an output mask.

Figures 2C, 2D:
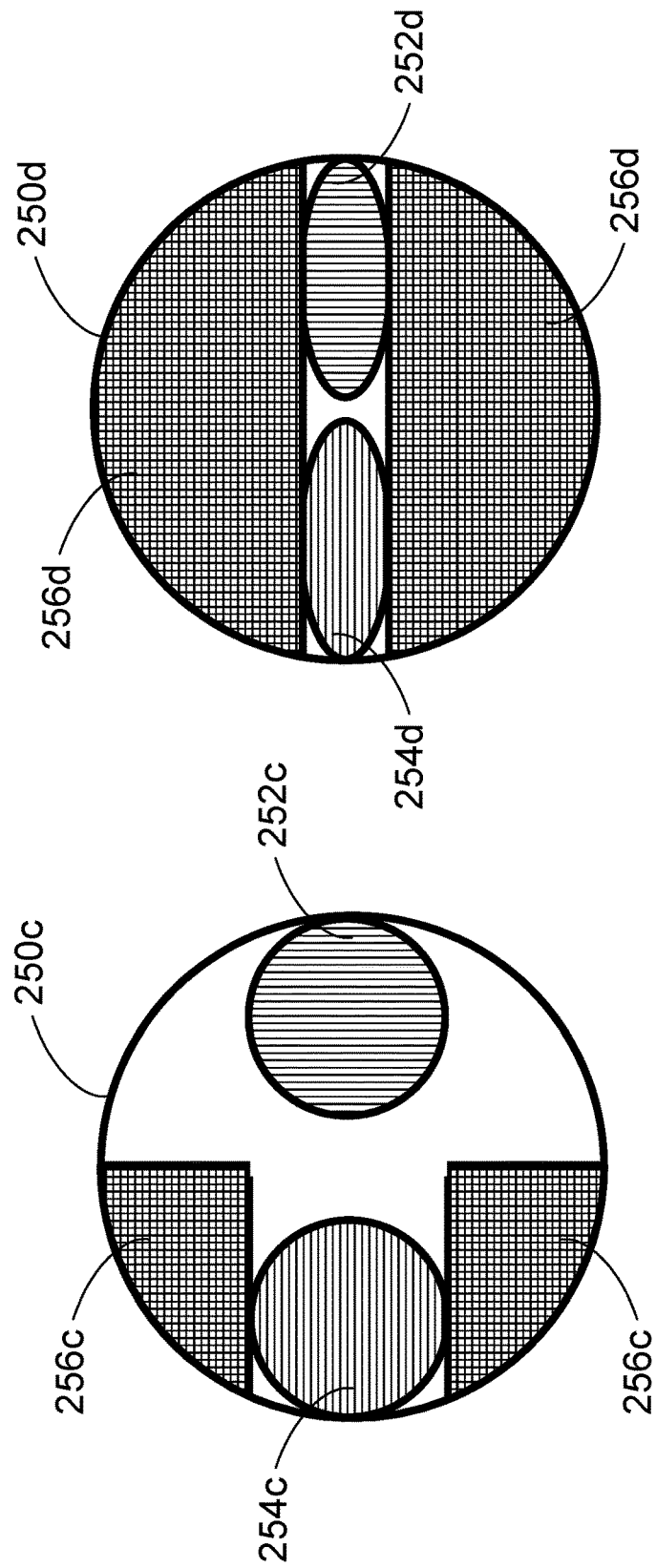

FIG. 2c is a simplified plan view of an objective lens aperture 250c having a region 252c that may be used for an input beam, a region 254c that may be used for a reflected beam, and regions 256c that may be used for collection of the portion of scattered light that is provided to a dark-field detector. This is an example of forward scattering because only the scattered light that is forward of the input beam passes to the dark-field detector. This is also an example of double dark-field imaging because the collection space differs from the illumination space in both polar and azimuthal directions. The scattered light that is collected in the middle region of the objective lens 250c that includes the regions 252c, 254c and the regions surrounding the region 252c is blocked by an output mask.

FIG. 2d is a simplified plan view of an objective lens aperture 250d having a region 252d that may be used for an input beam, a region 254d that may be used for a reflected beam, and regions 256d that may be used for collection of the portion of scattered light that is provided to a dark-field detector. This example uses more of the available NA of the objective lens 250d than previous examples by changing the shapes of the regions 252d, 254d and increasing the collection space of the scattered light. The shape of the regions 252d, 254d can be changed by changing the shape of a shaped beam passing through an input aperture of an input mask. This is an example of double dark-field imaging because the collection space differs from the illumination space in both polar and azimuthal directions. The scattered light that is collected in the middle region of the objective lens 250d that includes the regions 252d, 254d is blocked by an output mask.

Figure 2E:
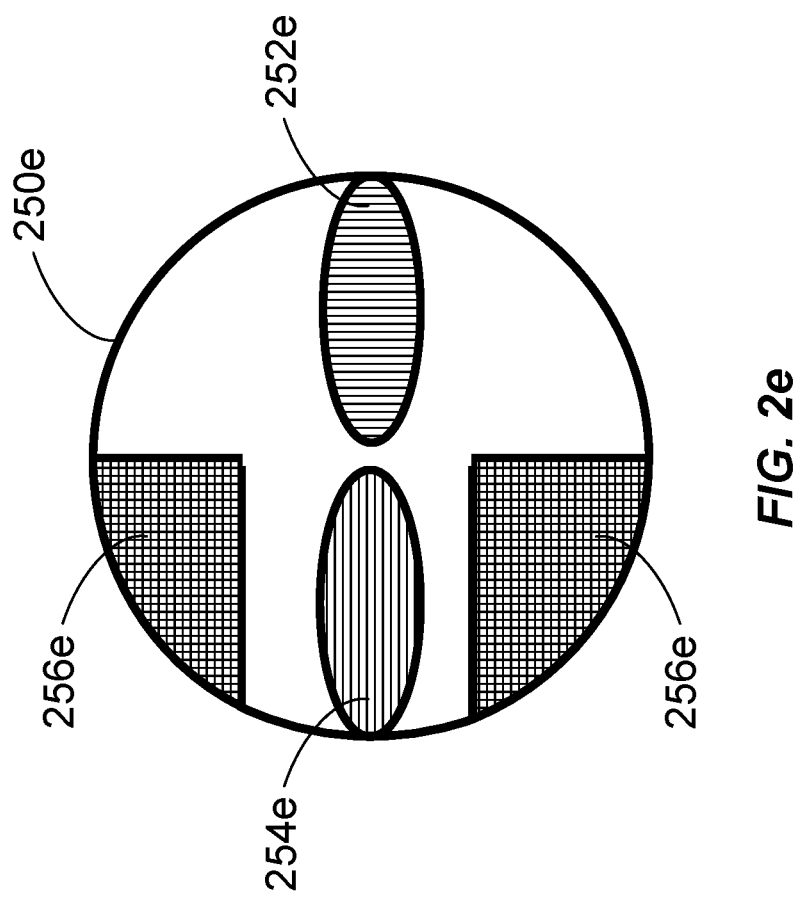

FIG. 2e is a simplified plan view of an objective lens aperture 250e having a region 252e that may be used for an input beam, a region 254e that may be used for a reflected beam, and regions 256e that may be used for collection of the portion of scattered light that is provided to a dark-field detector. This is an example of forward scattering because only the scattered light that is forward of the input beam passes to the dark-field detector. This is also an example of double dark-field imaging because the collection space differs from the illumination space in both polar and azimuthal directions. This example is similar to FIG. 2c in that the scattered light that is collected in the middle region of the objective lens 250e that includes the regions 252e, 254e and the regions surrounding the region 252e is blocked by an output mask.

As these examples illustrate, single or double dark-field imaging can be performed, or scattered light passing through any particular region of the objective lens can be collected, by using an appropriate output mask having one or more output apertures corresponding to the desired collection space of the objective lens. The collection space can be changed by changing the input and/or output mask and without any change to the objective lens. Any of these examples, combinations of these examples, or other configurations may be used with the flexible mode scanning optical microscopy and inspection system shown in FIG. 1.

Additionally, the available NA used for illumination can be changed by changing the input mask. In some embodiments, a large part of the NA can be used for illumination to achieve high resolution grey-field imaging or bright-field imaging. An example of grey-field imaging is provided in FIG. 3. Thus, embodiments described herein provide flexible dark-field imaging in addition to high resolution grey-field and maximum resolution bright-field imaging.

Figure 3:
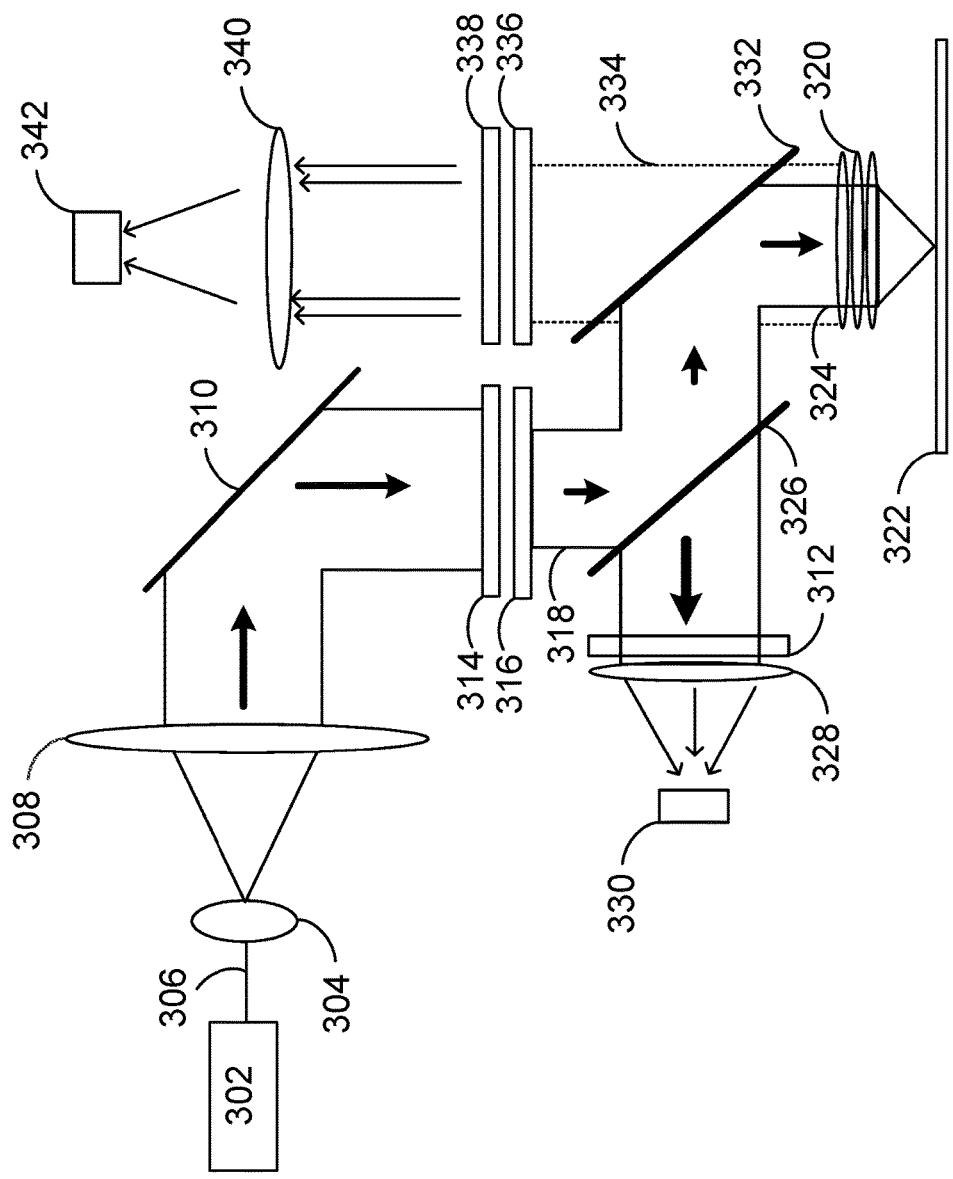
FIG. 3 is a simplified cross-sectional view of a flexible mode scanning optical microscopy and inspection system in accordance with another embodiment.

FIG. 3 is a simplified cross-sectional view of a flexible mode scanning optical microscopy and inspection system in accordance with another embodiment. In this example, an input beam 306 provided by a source 302 passes through a beam expander 304 and collimator 308. The input beam is directed from the collimator 308 toward a polarizing element 314 and input mask 316. In some embodiments, the input beam may be directed toward the polarizing element 314 using one or more reflectors such as mirror 310. The polarizing element 314 imparts a particular polarization to the input beam. The input mask 316 may be configured to block a portion of the input beam and may include an input aperture arranged to allow a portion of the input beam to pass as a shaped beam 318. In this example, the input mask 316 blocks outer edges of the input beam and allows a central portion to pass so that the shaped beam 318 is narrower than the input beam.

The shaped beam 318 is directed from the input mask 316 to an objective lens 320 where it is focused onto a sample 322. The shaped beam 318 may be directed to the objective lens using one or more reflectors such as beam splitters 326, 332. The shaped beam 318 is focused onto the sample 322 at a normal incidence so that a reflected beam 324 passes through substantially the same region of the objective lens 320. In this example, the shaped beam 318 passes through a first portion of the objective lens 320, and the reflected beam 324 passes through a second portion of the objective lens 320 that is substantially the same as the first portion.

The reflected beam 324 is directed from the objective lens 320 to a bright-field detector 330. In this example, the reflected beam 324 is directed to the bright-field detector 330 using beam splitters 326, 332 and focusing element 328. Polarizing element 312 may also be used as shown in this example. Bright-field signals are generated from the reflected beam 324.

The objective lens 320 also collects scattered light from the sample 322. The scattered light is a portion of the shaped beam 318 that is scattered by the sample (or by defects on the sample). The scattered light may pass through the first and second portions of the objective lens 320 as well as a third portion of the objective lens 320. The third portion of the objective lens 320 will be described more fully below with regard to FIG. 4. In some embodiments, the third portion of the objective lens 320 comprises different portions of the objective lens 320 than the first and second portions.

The scattered light is directed from the objective lens 320 toward a focusing element 340 and dark-field detector 342. FIG. 3 shows scattered light 334 passing through the beam splitter 332 to polarizing element 336 and output mask 338. The output mask 338 may be configured to block portions of the scattered light 334 that pass through the first and second portions of the objective lens 320. The output mask 338 may include one or more output apertures arranged to allow at least a portion of the scattered light 334 that passes through the third portion of the objective lens 320 to pass as the portion of the scattered light that is directed to the dark-field detector 342. Dark-field signals are generated from the portion of the scattered light that is received at the dark-field detector 342.

Figure 4:
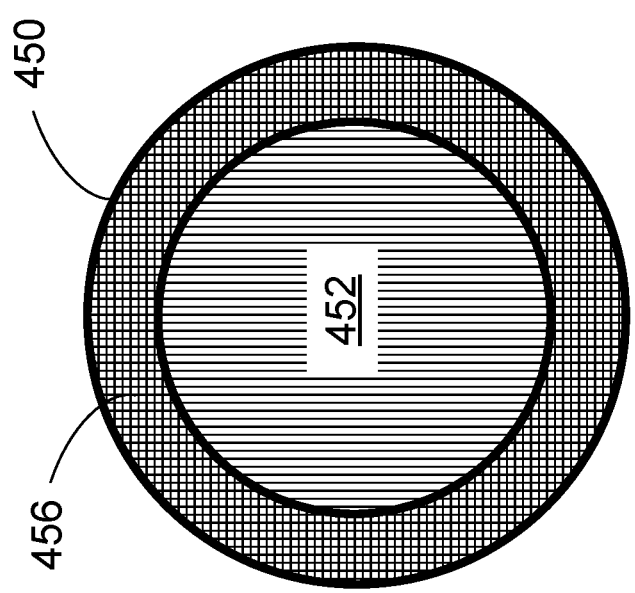
FIG. 4 is a simplified plan view of an objective lens aperture showing how different regions of the objective lens aperture may be used for directing light to a sample and collecting light from a sample in accordance with an embodiment.

FIG. 4 is a simplified plan view of an objective lens aperture showing how different regions of the objective lens may be used for directing light to a sample and collecting light from a sample in accordance with an embodiment. FIG. 4 shows an objective lens aperture 450 having a region 452 that may be used for an input beam (e.g., shaped beam 318 in FIG. 3) and for a reflected beam (e.g., reflected beam 324 in FIG. 3). The objective lens aperture 450 also has a region 456 that may be used for collection of the portion of scattered light that is provided to a dark-field detector (e.g., the scattered light that passes through output mask 338 in FIG. 3).

The pattern shown in FIG. 4 is not intended to suggest that different regions of the objective lens 450 are configured to only let light from particular sources pass. Instead, in this example, an input mask (e.g., input mask 316 in FIG. 3) is configured to provide a shaped beam that is directed to region 452. The objective lens 450 focuses the beam onto a sample at a normal incidence, and a reflected beam is received substantially at region 452. Scattered light may be collected across the entire NA of the objective lens, but an output mask (e.g., output mask 338 in FIG. 3) is configured to allow only that portion of the scattered light that is collected in region 456 to pass. This is an example of grey-field imaging due to the proximity of the scattered light region 456 to the illumination region 452. The directly reflected and/or scattered light that is collected in the central region of the objective lens 450 that includes the region 452 is blocked by the output mask.

It should be appreciated that the systems shown in FIG. 1 and FIG. 3 are used merely as examples, and many components are optional or may be configured differently based on the particular application. The input and output masks described herein may be used with inspection systems having other configurations. The systems may or may not include the beam expanders, collimators, polarizing elements, reflectors, beam splitters, lenses, and detectors shown herein. Additionally, the systems may include other components not included in these examples.

Figure 5:
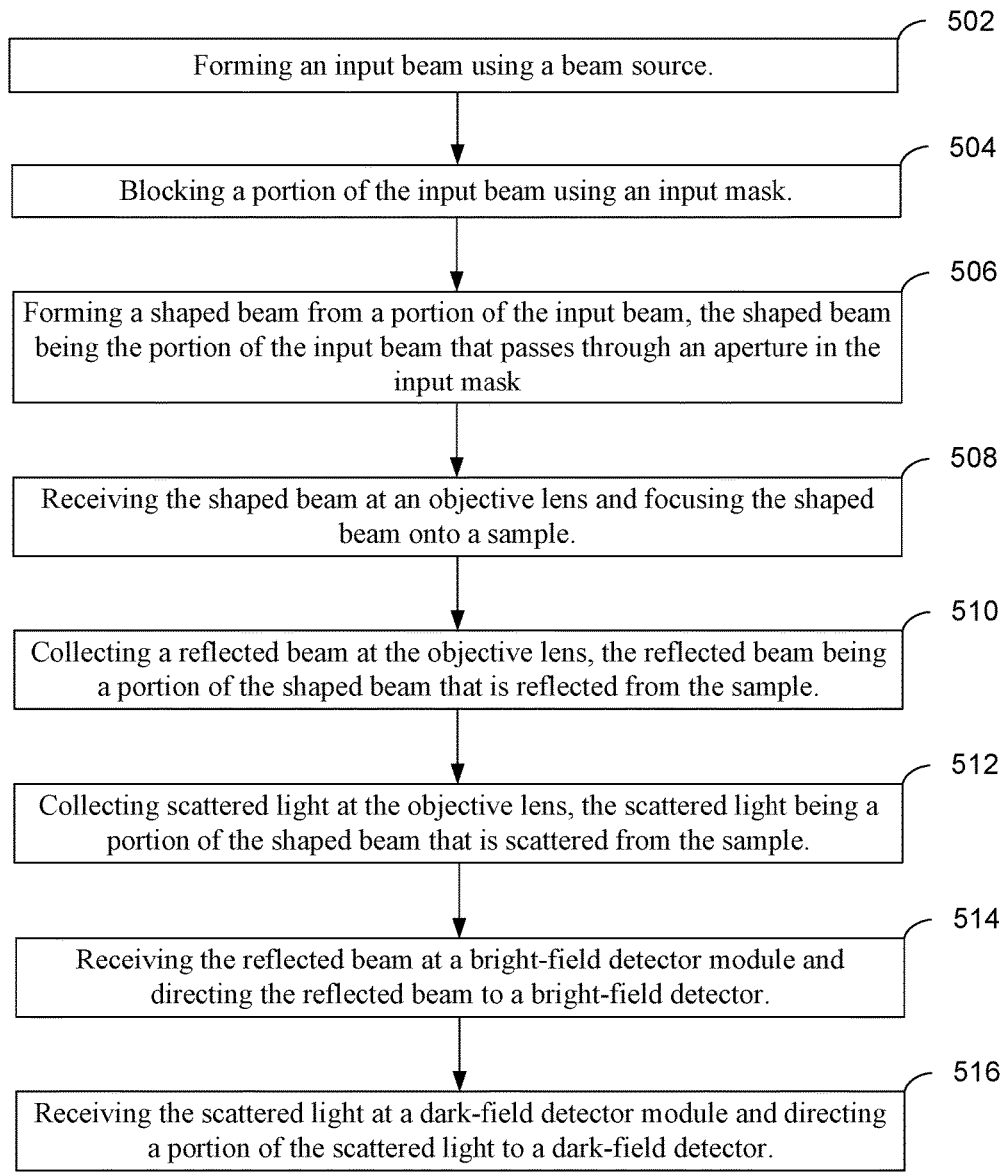
FIG. 5 is a flowchart that outlines a method for flexible inspection of a sample in accordance with an embodiment.

FIG. 5 is a flowchart that outlines a method for flexible inspection of a sample in accordance with an embodiment. The method includes forming an input beam using a beam source (502), blocking a portion of the input beam using an input mask (504), and forming a shaped beam from a portion of the input beam, the shaped beam being the portion of the input beam that passes through an aperture in the input mask (506). The method also includes receiving the shaped beam at an objective lens and focusing the shaped beam onto a sample (508). The shaped beam may pass through a first portion of the objective lens. The method also includes collecting a reflected beam at the objective lens, the reflected beam being a portion of the shaped beam that is reflected from the sample (510). The reflected beam may pass through a second portion of the objective lens. The method also includes collecting scattered light at the objective lens, the scattered light being a portion of the shaped beam that is scattered by the sample (512). The scattered light may pass through the first and second portions of the objective lens and through a third portion of the objective lens. In some embodiments, the first and second portions of the objective lens are different from the third portion of the objective lens. In other embodiments, the first, second, and third portions of the objective lens comprise different portions of the objective lens. The method also includes receiving the reflected beam at a bright-field detector module and directing the reflected beam to a bright-field detector (514), and receiving the scattered light at a dark-field detector module and directing a portion of the scattered light to a dark-field detector (516). The dark-field detector module includes an output mask having one or more output apertures. The output mask may block the scattered light that passes through the first and second portions of the objective lens, and the one or more output apertures may allow at least part of the scattered light that passes through the third portion of the object lens to pass as the portion of the scattered light that is directed to the dark-field detector.

It should be appreciated that the specific steps illustrated in FIG. 5 provide a particular method according to an embodiment. Other sequences of steps may also be performed according to alternative embodiments. For example, alternative embodiments may perform the steps outlined above in a different order. Moreover, the individual steps illustrated in FIG. 5 may include multiple sub-steps that may be performed in various sequences. Furthermore, additional steps may be added or removed depending on the particular application.

While the foregoing is directed to specific embodiments, other and further embodiments may be devised without departing from the basic scope thereof, and the scope thereof is determined by the claims that follow.

What is claimed is:

1. A system for bright-field and dark-field inspection of a sample, comprising:
    a source configured to provide an input beam;
    an input mask having an input aperture, the input mask configured to block a portion of the input beam and the input aperture arranged to allow a portion of the input beam to pass as a shaped beam;
    an objective lens arranged to:
        receive the shaped beam and focus the shaped beam onto a sample at a first oblique angle, the shaped beam passing through a first portion of the objective lens;
        collect a reflected beam, the reflected beam being a portion of the shaped beam that is reflected from the sample at a second oblique angle, the reflected beam passing through a second portion of the objective lens; and
        collect scattered light, the scattered light being a portion of the shaped beam that is scattered by the sample, the scattered light passing through the first and second portions of the objective lens and a third portion of the objective lens, wherein the first, second, and third portions of the objective lens comprise different portions of the objective lens;
    a bright-field detector module configured to receive the reflected beam from the objective lens and direct the reflected beam to a bright-field detector; and
    a dark-field detector module configured to receive the scattered light from the objective lens and direct a portion of the scattered light to a dark-field detector, the dark-field detector module including an output mask having one or more output apertures, the output mask configured to block the scattered light that passes through the first and second portions of the objective lens, and the one or more output apertures arranged to allow at least part of the scattered light that passes through the third portion of the object lens to pass as the portion of the scattered light that is directed to the dark-field detector.

2. The system of claim 1 wherein the first oblique angle is an oblique incidence angle.

3. The system of claim 1 wherein the first, second, and third portions of the objective lens are non-overlapping.

4. The system of claim 1 wherein the first, second, and third portions of the objective lens correspond to an entire numerical aperture of the objective lens.

5. The system of claim 1 wherein the first, second, and third portions of the objective lens correspond to less than an entire numerical aperture of the objective lens.

6. The system of claim 1 wherein the third portion of the objective lens includes a portion of the objective lens that is outside a plane of incidence of the shaped beam.

7. The system of claim 1 further comprising:
    a beam expander for expanding the input beam;
    a collimator for collimating the input beam;
    a polarizer for polarizing the shaped beam; and
    one or more beam splitters for separating at least a portion of the scattered light from the reflected beam.

8. A system for flexible inspection of a sample, comprising:
    a source configured to provide an input beam;
    an input mask having an input aperture, the input mask configured to block a portion of the input beam and the input aperture arranged to allow a portion of the input beam to pass as a shaped beam;
    a beam splitter arranged to reflect the shaped beam;
    an objective lens arranged to:
        receive the shaped beam from the beam splitter and focus the shaped beam onto a sample, the shaped beam passing through a first portion of the objective lens;
        collect a reflected beam, the reflected beam being a portion of the shaped beam that is reflected from the sample, the reflected beam passing through a second portion of the objective lens and being reflected by the beam splitter; and
        collect scattered light, the scattered light being a portion of the shaped beam that is scattered by the sample, the scattered light passing through the first and second portions of the objective lens and through a third portion of the objective lens, wherein the first and second portions of the objective lens are different from the third portion of the objective lens, the scattered light passing through the first, second, and third portions of the objective lens and through the beam splitter;
    a bright-field detector module configured to receive the reflected beam from the beam splitter and direct the reflected beam to a bright-field detector; and
    a dark-field detector module configured to receive the scattered light passing through the beam splitter and direct a portion of the scattered light to a dark-field detector, the dark-field detector module including an output mask arranged downstream of the beam splitter and having one or more output apertures, the output mask configured to block the scattered light that passes through the first and second portions of the objective lens, and the one or more output apertures arranged to allow at least part of the scattered light that passes through the third portion of the object lens to pass as the portion of the scattered light that is directed to the dark-field detector.

9. The system of claim 8 wherein the first and second portions of the objective lens comprise substantially the same portions of the objective lens.

10. The system of claim 8 wherein the first and second portions of the objective lens comprise different portions of the objective lens.

11. The system of claim 8 wherein the shaped beam is focused onto the sample at a normal incidence.

12. The system of claim 8 wherein the output mask blocks the scattered light that passes through a center of the objective lens.

13. The system of claim 8 further comprising:
a beam expander for expanding the input beam;
a collimator for collimating the input beam;
a polarizer for polarizing the shaped beam; and
one or more beam splitters for separating at least a portion of the scattered light from the reflected beam.

14. A method for flexible inspection of a sample, the method comprising:
forming an input beam using a beam source;
blocking a portion of the input beam using an input mask;
forming a shaped beam from a portion of the input beam, the shaped beam being the portion of the input beam that passes through an aperture in the input mask;
receiving the shaped beam at an objective lens and focusing the shaped beam onto a sample, the shaped beam passing through a first portion of the objective lens;
collecting a reflected beam at the objective lens, the reflected beam being a portion of the shaped beam that is reflected from the sample, the reflected beam passing through a second portion of the objective lens;
receiving the reflected beam at a bright-field detector module and directing the reflected beam to a bright-field detector;
collecting scattered light at the objective lens, the scattered light being a portion of the shaped beam that is scattered by the sample, the scattered light passing through the first and second portions of the objective lens and through a third portion of the objective lens, wherein the first, second, and third portions of the objective lens comprise different portions of the objective lens; and
receiving the scattered light at a dark-field detector module and directing a portion of the scattered light to a dark-field detector, the dark-field detector module including an output mask having one or more output apertures, the output mask blocking the scattered light that passes through the first and second portions of the objective lens, and the one or more output apertures allowing at least part of the scattered light that passes through the third portion of the object lens to pass as the portion of the scattered light that is directed to the dark-field detector.

15. The method of claim 14 wherein the shaped beam is focused onto the sample at an oblique angle.

16. The method of claim 14 wherein the output mask blocks the scattered light that passes through a center of the objective lens.

17. The method of claim 14 further comprising:
after receiving the reflected beam at the bright-field detector module and receiving the scattered light at the dark-field detector module:
blocking a second portion of the input beam using a second input mask;
forming a second shaped beam from a portion of the input beam, the second shaped beam being the portion of the input beam that passes through a second aperture in the second input mask;
receiving the second shaped beam at the objective lens and focusing the second shaped beam onto the sample, the second shaped beam passing through a fourth portion of the objective lens different from the first portion of the objective lens;
collecting a second reflected beam at the objective lens, the second reflected beam being a portion of the second shaped beam that is reflected from the sample, the second reflected beam passing through a fifth portion of the objective lens different from the second portion of the objective lens;
collecting second scattered light at the objective lens, the second scattered light being a portion of the second shaped beam that is scattered from the sample, the second scattered light passing through the fourth and fifth portions of the objective lens and through a sixth portion of the objective lens, wherein the fourth and fifth portions of the objective lens are different from the sixth portion of the objective lens;
receiving the second reflected beam at the bright-field detector module and directing the second reflected beam to the bright-field detector;
receiving the second scattered light at the dark-field detector module and directing a portion of the second scattered light to the dark-field detector, the dark-field detector module including a second output mask having one or more second output apertures, the second output mask blocking the second scattered light that passes through the fourth and fifth portions of the objective lens, and the one or more second output apertures allowing at least part of the second scattered light that passes through the sixth portion of the object lens to pass as the portion of the second scattered light that is directed to the dark-field detector.

* * * * *